United States Patent [19]
Bennett et al.

[11] Patent Number: 5,296,120
[45] Date of Patent: Mar. 22, 1994

[54] APPARATUS FOR THE REMOVAL OF CHLORIDE FROM REINFORCED CONCRETE STRUCTURES

[75] Inventors: John E. Bennett, Chardon, Ohio; Jacob R. Blasius, Boca Raton, Fla.; Thomas A. Mitchell; Thomas R. Turk, both of Mentor, Ohio; Thomas J. Schue, Huntsburg, Ohio

[73] Assignee: Eltech Systems Corporation, Boca Raton, Fla.

[21] Appl. No.: 794,188

[22] Filed: Nov. 19, 1991

Related U.S. Application Data

[63] Continuation-in-part of Ser. No. 526,480, May 21, 1990, abandoned.

[51] Int. Cl.$^5$ .............................................. C23F 13/00
[52] U.S. Cl. .................................... 204/196; 204/130; 204/147; 204/280; 204/284
[58] Field of Search ............... 204/130, 147, 148, 196, 204/197, 280, 284

[56] References Cited

U.S. PATENT DOCUMENTS

| | | | |
|---|---|---|---|
| 2,805,191 | 9/1987 | Hersch | 204/402 |
| 3,493,484 | 2/1970 | Berg et al. | 204/431 |
| 3,538,201 | 11/1970 | Eberle et al. | 264/41 |
| 3,705,089 | 12/1972 | Grubb | 204/414 |
| 4,255,241 | 3/1981 | Kroon et al. | 204/196 |
| 4,772,377 | 9/1988 | Geist et al. | 204/415 |
| 4,832,803 | 5/1989 | Vennesland | 204/130 |
| 4,855,027 | 8/1989 | McCready | 204/147 |
| 4,865,702 | 9/1989 | Miller et al. | 264/27 |
| 4,900,410 | 2/1990 | Bennett et al. | 204/196 |
| 5,141,607 | 8/1992 | Swait | 204/147 |

FOREIGN PATENT DOCUMENTS 1474413 5/1977 United Kingdom .

OTHER PUBLICATIONS

Slater et al, "Electrochemical Removal of Chlorides From Concrete Bridge Decks", Material Performance, Nov. 1976, pp. 21-26.
Lankard et al, "Neutralization of Chloride in Concrete", F.H.A. Report No. FHWA-RD-76-60, Sep. 1975, pp. 46 and 96.

*Primary Examiner*—T. Tung
*Attorney, Agent, or Firm*—John J. Freer

[57] ABSTRACT

The present invention resides in an apparatus for removing chloride ions from a reinforced concrete structure. The apparatus comprises an integrated anode assembly which includes an anode and an electrolyte, the anode being immersed in the electrolyte. The integrated anode assembly is flexible and conformable to the surface configuration of the concrete structure to which it is applied. Means are provided for removably adhering the integrated anode assembly to the concrete structure, conformed to said surface configuration, and for establishing an electric current between said anode and the reinforcement of said concrete structure.

21 Claims, 3 Drawing Sheets

APPARATUS FOR THE REMOVAL OF CHLORIDE FROM REINFORCED CONCRETE STRUCTURES

CROSS-REFERENCE TO RELATED APPLICATION

This application is a continuation-in-part of U.S. patent application Ser. No. 526,480, filed May 21, 1990, now abandoned.

BACKGROUND OF THE INVENTION

1. Technical Field

The present invention relates to the removal of chloride ions from reinforced concrete structures, such as bridge decks and substructures, and more specifically, to a novel apparatus for such removal.

2. Description of the Prior Art

It is generally acknowledged that a major cause of the deterioration of reinforced concrete structures, such as bridge surfaces and substructures, is the corrosion of reinforcing steel due to the ingress of chloride ions from de-icing salts or sea water. Chloride causes active corrosion by destroying the natural passivity of steel in the alkaline environment of concrete. Prevention of corrosion of the steel components by electrochemical means can be accomplished by either applying cathodic protection or by removal of sufficient chloride to allow the steel to repassivate and then prevent the future ingress of chloride ion.

Prior publication entitled "Electrochemical Removal of Chlorides From Concrete Bridge Decks", Materials Performance, November, 1976, pages 21–26, by J. E. Slater et al. discloses the electrochemical removal of chloride ions by applying an anode and electrolyte to the structure surface and passing current between the anode and the reinforcing steel as a cathode. Since anions migrate toward the anode, it is possible to migrate chloride ions away from the steel and out of the concrete structure. The speed at which this process is accomplished is dependent largely on the magnitude of the applied current. In the Slater et al. procedure, a liquid electrolyte of calcium hydroxide dissolved in water was used, formed as ponds on the surface of the bridge deck. The electrolyte contained an ion exchange resin slurried into the electrolyte. The anode was platinized titanium. Direct current power leads were attached to the metal anode and to the steel reinforcing bars in the bridge deck. The chloride removal was undertaken using a direct current varying between about 1 and 2.5 amps per square foot with a voltage from 100 to 120 volts. The article reported that up to 90% of the chloride ions in the bridge deck could be removed in a 24-hour period.

Prior U.S. Pat. No. 4,832,803 teaches extracting chlorides from a reinforced concrete structure by attaching a thin net electrode to a surface of the concrete structure, and then applying a thin viscous chloride absorbing electrolyte material such as gunite to the surface of the concrete structure to cover the net electrode. A direct current between the reinforcing members and the net electrode causes chloride ions to migrate to and be absorbed in the electrolyte layer. One suggested electrode net was graphite fibers having high conductivity. An object in prior U.S. Pat. No. 4,832,803 was to provide a method which could be used not only on horizontal surfaces but also surfaces which were other than horizontal surfaces.

A Federal Highway Administration report number FHWA-RD-76-60 entitled "Neutralization of Chloride in Concrete", D. R. Lankard and others, 1975, discloses on page 96, using a self-supporting sponge containing an electrolyte. A metal anode can be permanently attached to the sponge surface. Alternatively, a graphite cloth anode can be made an integral part of the sponge, for instance as a filler in a sponge sandwich. The electrolyte in the sponge can be replenished as necessary, for instance by spraying the upper surface of the sponge/anode combination. An ion exchange resin can be spread on the deck surface before placement of the sponge, and can be successfully held in position by the sponge, particularly if the bottom surface of the sponge has a ribbed or waffled texture. It is mentioned in the report that the sponge concept is attractive because of its ease of placement, its portability, and its ease of reuse. From the context of the report, it appears that the authors contemplated treating only substantially horizontal surfaces, albeit surfaces that could have surface irregularities and gradients.

SUMMARY OF THE INVENTION

The present invention resides in an apparatus for removing chloride ions from a reinforced concrete structure. The apparatus comprises an integrated anode assembly which includes an anode and an electrolyte, the anode being immersed in the electrolyte. The integrated anode assembly is flexible and conformable to the surface configuration of the concrete structure to which it is applied. Means are provided for removably adhering the integrated anode assembly to the concrete structure, conformed to said surface configuration, and for establishing an electric current between said anode and the reinforcement of said concrete structure.

Preferably, the anode of the integrated anode assembly is ductile such that the anode assembly, once conformed to a surface configuration, retains such configuration until reconformed. Alternatively, the anode of the integrated anode assembly is resilient such that the anode assembly, when removed from a concrete structure, regains its original configuration. Preferably, the integrated anode assembly of the present invention has sufficient flexibility that it can be rolled into a compact roll, and then, at a point of use, unrolled and applied against the surface of a concrete structure to be treated.

The anode of the integrated anode assembly is preferably one that is dimensionally stable in that it is inert and is not consumed during the period of chloride extraction. A preferred electrolyte is a flexible porous sheet of polymeric foam or a synthetic or natural fibrous material having sufficient flexibility to be formed into a compact roll, the sheet having a continuous phase such as water uniformly distributed therein which functions as a vehicle for the transport of chloride ions.

It will be apparent to those skilled in the art that although the integrated anode assembly of the present invention can be applied to any surface of a reinforced concrete structure, the present invention is primarily useful in the treatment of non-planar surfaces which are other than horizontal, e.g., a curved vertical surface.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
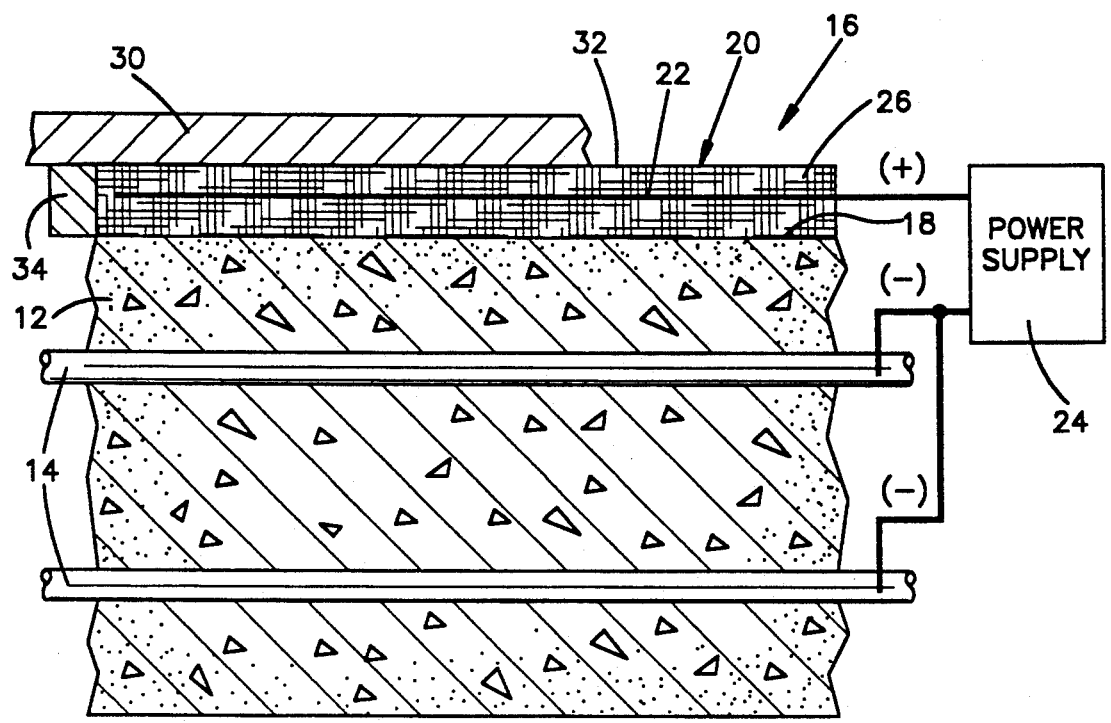
FIG. 1 is a section elevation view of a reinforced concrete structure having a chloride ion removal apparatus applied to a surface of said structure in accordance with the present invention.

Referring to FIG. 1, the concrete deck 12 contains reinforcing rods 14. The reinforcing rods are tied together in a conventional criss-cross pattern (not shown). An apparatus 16 for chloride ion removal is applied to a surface 18 of the concrete structure 12.

The apparatus 16 is an integrated anode assembly which comprises a thin, reusable electrolyte 20 having immersed therein, an anode 22. The electrolyte 20 has width and length (plan) dimensions effective for the treatment of surface 18. The anode 22 is substantially coextensive with the electrolyte 20. The anode 22 is connected to the positive terminal of an electrical power supply 24. The negative terminal of the power supply 24 is electrically connected to the reinforcing rods 14. The rods 14 thus serve as a cathode, defining with the anode 22, an electrolytic cell.

For purposes of the present application, the term "immersed" means embedded within as shown in FIG. 1, or can include an anode 22 contiguous with the surface 18 of the electrolyte 20; for instance, exposed but embedded in the surface 18. In either instance, the anode 22 and electrolyte 20 comprise an integrated assembly.

The reinforced concrete structure 12 is impregnated with chloride ions that may come from such sources as de-icing salts and sea water. Such chloride ions cause active corrosion by destroying the natural passivity of steel, which is normally in an alkaline environment of the concrete.

The chloride ions can be removed electrochemically from the reinforced concrete structure 12 by passing a current between the anode 22 and the reinforcing rods 14. Since anions, migrate toward the anode, the chloride ions migrate away from the steel and out of the concrete structure. The speed at which this process is accomplished is dependent largely upon the magnitude of the applied current.

In the practice of the present invention, the anode 22 preferably is inert in the chloride removal process, or one that is frequently referred to as a dimensionally stable anode. The anode 22 is not sacrificial or consumed in the chloride removal process. Dimensionally stable anodes are well known. They usually comprise a film-forming valve metal base, such as titanium, tantalum, zirconium, aluminum, niobium and tungsten, which have the capacity to conduct current in the cathodic direction and to resist the passage of current in the anodic direction. These base metals are also resistant to electrolytes and conditions used within an electrolytic cell. A preferred valve metal, based on cost, availability, and electrical and chemical properties, is titanium. It is well known that in the anodic direction, the resistance of the valve metals to the passage of current can go up rapidly due to the formation of an oxide layer thereon. It is therefore customary to apply electrically conductive electrocatalytic coatings to the dimensionally stable valve metal bases. The electrocatalytic coatings have the capacity to continue to conduct current to the electrolyte over long periods of time without becoming passivated. Such coatings can contain catalytic metals or oxides from the platinum group metals such as platinum, palladium, iridium, ruthenium, rhodium, and osmium. The coatings also preferably contain a binding or protective agent such as titanium dioxide, tantalum pentoxide, or other valve metal oxide in sufficient amount to protect the platinum group metal or oxide from being removed from the valve metal base in the electrolysis process and to bind the platinum group metal or oxide to the valve metal base. An example of one such dimensionally stable anode is a titanium substrate which has been coated with an electrocatalytic coating consisting of a mixture of platinum and iridium oxide.

Other dimensionally stable anodes that can be used in the practice of the present invention are those having spinel coatings and those disclosed in U.S. Pat. Nos. 3,776,384, 3,855,092, 3,751,296, 3,632,498, 3,917,518 and 4,180,445. The disclosures of these patents are incorporated herein by reference.

Figure 3:
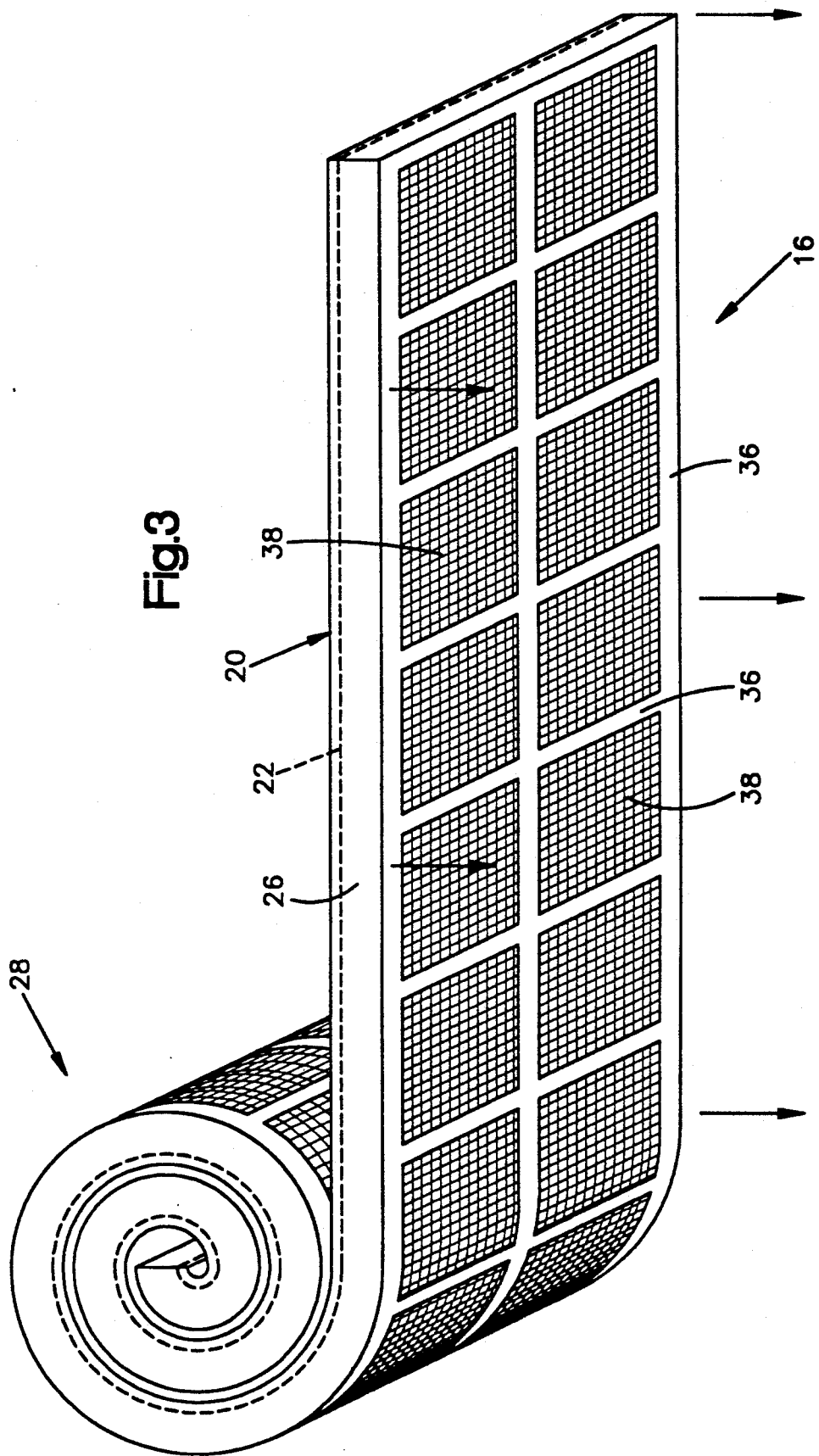
FIG. 3 is an elevation perspective view of the chloride ion removal apparatus of FIG. 1 in roll form.

The electrolyte 20 comprises a flexible and porous, multi-component sheet 26. The porous sheet 26 should have sufficient flexibility that it can be rolled into a compact roll 28 as shown in FIG. 3, and applied to the surface of a concrete structure and made to conform or at least substantially conform to such surface. Although the present invention can be used with the top surface of concrete structures, such as bridge decks, it is contemplated that is will be most advantageously used with other than horizontal surfaces, for instance the vertical curved surface of a bridge column.

A preferred porous sheet 26 is one having a strong capillary attraction, for instance a sheet which may be used for absorbing non-viscous liquids from an industrial spill or leak.

The multi-component porous electrolyte sheet will have a component of porous cellulosic material containing cellulosic fibers. Usually it will have at least a preponderance of cellulosic fibers. The sheet will have at least one other component (in addition to electrolyte solution and immersed anode). Excellent water absorption and retention were obtained using a cellulosic sheet manufactured by Matarah Industries, Inc. (Milwaukee, Wis.) under the trademark "SORB$_x$". This material is a blend of components of about 53%–67% cellulosic fibers component and about 47%–33% polymeric fibers component. Examples of polymeric fibers blended with the cellulosic fibers include olefin polymers such as polypropylene, polyethylene, and mixtures thereof. One "SORB$_x$" material tested has a thickness of about ⅜" and is marketed in roll form. The material is a blend of 67% cellulose fiber component and 33% polypropylene fibers component. Thus, as with "SORB$_x$" material, the multi-component electrolyte sheet can be a blend of components.

The necessary cellulosic fibers may also be present for example in layers of components, such as with a layer of a synthetic polymer of usually a polymeric foam or synthetic sponge material. Thus, the cellulosic fiber compoent as a layer may be present with a polymeric foam component which itself is a layer. When the multi-component porous electrolyte sheet is so layered, a polymeric foam or synthetic sponge layer may function as a backing and add strength to the porous sheet 26. Multiple layers of a cellulosic sheet can be used with one or more polymeric layers. In this way, the multi-component electrolyte sheet may be two or more component layers. Preferably, where the porous sheet 26 comprises multiple layers, the layer contiguous with the surface of the concrete structure, which layer itself may be a blend of components, is a layer comprising a preponderance of cellulosic fibers.

An example of one suitable polymeric foam is an open-cell polyurethane foam marketed by Scott Industrial Foam under the trade designation "Q Version". Such polymeric foams usually have a pore size ranging from about 10 to about 100 mills, viz., 0.01 to about 0.10 inch. Such foams characteristically contain from about 10 to about 100 pores per inch (ppi) and a porosity greater than 90%, for instance about 95%. Other suitable polymeric foam materials include polyether urethane, polyester urethane, polyesters, and olefin polymers such a polypropylene, polyethylene, vinyl polymers, and polyamides. Although non-conductive, thermoplastic polymeric foams are preferred, it is contemplated that electrically conductive foams can be utilized. Thus, flexible carbon and graphite foams could be used, and including the conductive polyurethane foams that contain particulate carbon. Also, non-hydrocarbon foams such as silicate foams may be employed.

The electrolyte 20 contains a continuous phase which functions as a vehicle for transport of chloride ions. The continuous phase can be a liquid electrolyte such as tap water impregnated into and retained by the pores of the porous sheet 26. A preferred continuous phase is a solution containing sufficient metal ions to conduct electricity without large resistance losses during the initial stages of the chloride removal process. Water containing about one to about ten grams per liter of calcium hydroxide ($CaOH_2$) has been successfully employed. Examples of other electrolyte solutions are those containing other alkali or alkaline earth metal hydroxides or salts, such as sodium hydroxide or potassium nitrate.

It is important to maintain the continuous phase uniformly distributed through the porous sheet 26 for uniform transfer of chloride ions within the electrolyte. In the case of water solutions containing metal ions such as from calcium hydroxide, this can be accomplished by adding to the solution a thickener or gelling agent which will prevent gravity flow of the continuous phase in the porous sheet 26 when the chloride removal apparatus of the present invention is applied to a surface other than horizontal, for instance,, vertical. A number of suitable gelling or thickening agents are available for use with water solutions. Examples are hydrocolloids such as agar, algin, carrageenan, gelatin, pectin, and starch. Other suitable thickening agents frequently employed are semi-synthetic cellulose derivatives such as carboxymethylcellulose, polyvinyl alcohol and synthetic carboxyvinylates, and mineral materials such as bentonite, silicates and colloidal silica. The amount of thickening agent employed should be an effective amount to maintain the continuous phase uniformly dispersed within the flexible porous sheet 26.

As an alternative, or in combination with use of a thickening agent, the porous sheet 26 can have a very small pore size, sufficient to maintain uniform distribution of the continuous phase within the sheet by means of capillary attraction.

Figure 2:
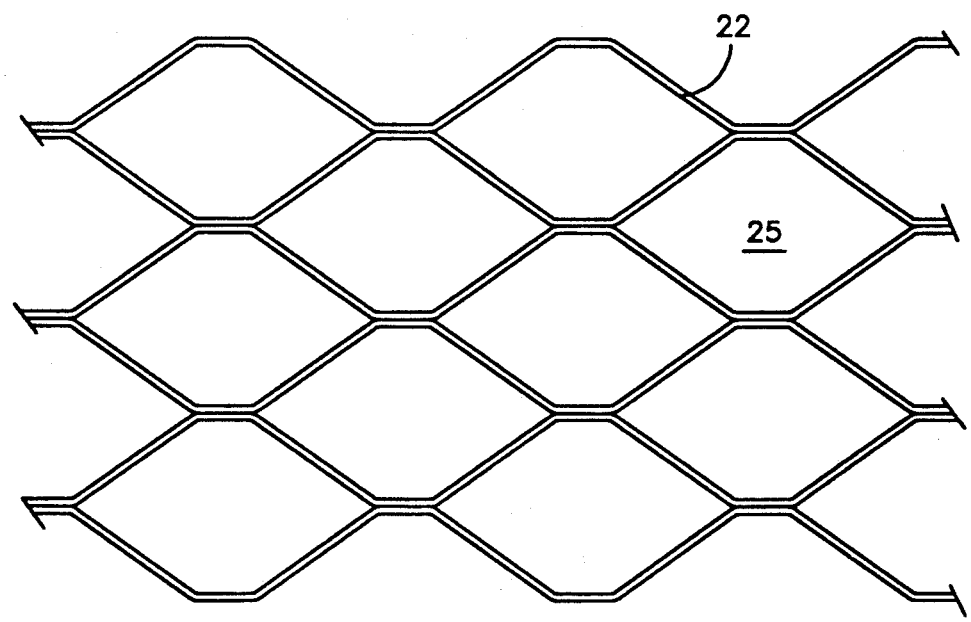
FIG. 2 is an enlarged plan view of one type of anode that can be used with the chloride ion removal apparatus of FIG. 1.

Preferably, the anode 22 is a metal that has a low modulus of elasticity or is ductile which allows it to be shaped to a desired configuration, and once-shaped, retains that configuration. However, it can be reshaped to a different configuration if desired. For instance, after use, it can be re-rolled into the roll 28 of FIG. 3, or it can be applied to a different surface of different configuration for reuse. Alternatively, the anode 22 can be resilient such that when removed from a concrete structure, it regains its original configuration. The anode 22 can take any preferably perforate form of construction employed in an electrochemical process, e.g., wire or ribbon. A preferred form of construction is an expanded metal mesh with a large percentage of open areas 25 such as shown in FIG. 2. The anode 22 can be adhered to a surface of the porous sheet 26 spaced from the surface to be applied to a concrete structure. However, preferably it is embedded in the porous sheet 26 as shown in the Figures. This can be accomplished by layering the porous sheet 26 and sandwiching the anode 22 between layers. Alternatively, the porous sheet 26 can be molded or formed, for instance by co-extrusion, with the anode embedded in place. The spacing of the anode from the surface of the concrete structure is not critical. There should be some gap, preferably for instance about 0.25 inch to two inches. A larger gap increases the resistivity in the apparatus, but allows for greater absorption of chloride ion in the electrolyte.

In the practice of the present invention, the amount of chloride removed in a given treatment time is generally proportional to the current density. It has been found advantageous to maintain the current density relatively low, for instance less than about 6 amps per square meter, preferably less than about 2 amps per square meter. At relatively low current densities, there tends to be less acidic dissolution of components in the concrete and loss of bond strength between the concrete and reinforcing bars. The chloride removal, process, using low current densities, can require an elapsed time of many weeks, for instance four to six weeks, for effective reduction in the chloride level. During this time, evaporation of the electrolyte can take place requiring that the electrolyte be frequently replenished. In addition, if the surface being treated is a traffic bearing surface, this can mean that the surface is out of commission for an inordinate period of time. In such instance, a top plate 30 (FIG. 1) can be applied to the exposed surface 32 of the electrolyte 20. The plate 30 can be a rigid plate and be non-conductive, such as a sheet of plywood, or conductive such as steel sheet, and applied to the exposed surface 32. When the top plate 30 is conductive, it can be used as an anode and in instances where it is such as steel and top plate 30 will constitute a consumable anode. Or the top plate 30 can be a flexible impervious member, for instance a sheet of flexible plastic integral with the electrolyte 20, for instance adhered to the electrolyte by means of a suitable adhesive (not shown). In any case, the plate 30 functions to suppress evaporation of electrolyte solution from the porous sheet 26, eliminating the need for frequent rewetting of the porous sheet 26 or replenishing of electrolyte solution.

In the event rewetting of the porous sheet 26 is necessary, this can be accomplished by removing the plate 30 and spraying an electrolyte solution onto the porous sheet 26. Alternatively, the apparatus of the present invention can comprise a means such as a sprinkler (not shown) for continuously introducing electrolyte solution into the porous sheet 26. For a large sheet 26, the sprinkler can feed electrolyte solution into the sheet at a plurality of points uniformly positioned across the surface area of the sheet.

In addition to suppressing evaporation, the plate 30 can be a load bearing plate which permits the concrete to remain in service while the chloride removal treatment is being carried on. Suitable spacers 34 can be used to maintain a uniform separation between the load bearing plate 30 and the concrete surface 18 to prevent compression of the electrolyte 20. As with the plate 30, these spacers 34 are conductive or non-conductive, e.g., may be made of wood, or plastic, but are preferably steel spacers in bar form.

In the embodiment of FIG. 3, the integrated anode assembly 16 is provided in the form of a roll 28 which can be unrolled onto the surface of a reinforced concrete structure to be treated. The assembly 16 contains a flexible mesh anode 22 which preferably, as indicated above, has a low modulus of elasticity so that when formed in the shape of a roll, it does not have a tendency to recover to a flattened shape. The integrated anode assembly 16 has alternating areas of contact adhesive 36, and electrolyte solution impregnated areas 38. The contact adhesive areas 36 hold the assembly 16 against the concrete surface to be treated while the electrolyte solution impregnated areas 38 permit the passage of current for chloride removal.

Alternative means for holding the sheet 26 to a surface can also be employed. For instance, the assembly 16 can be provided with a frame which holds the assembly to a surface, or it can be held to a surface with coupling devices such as various fasteners, screws, bolts, rivets, and other such devices.

Figure 4:
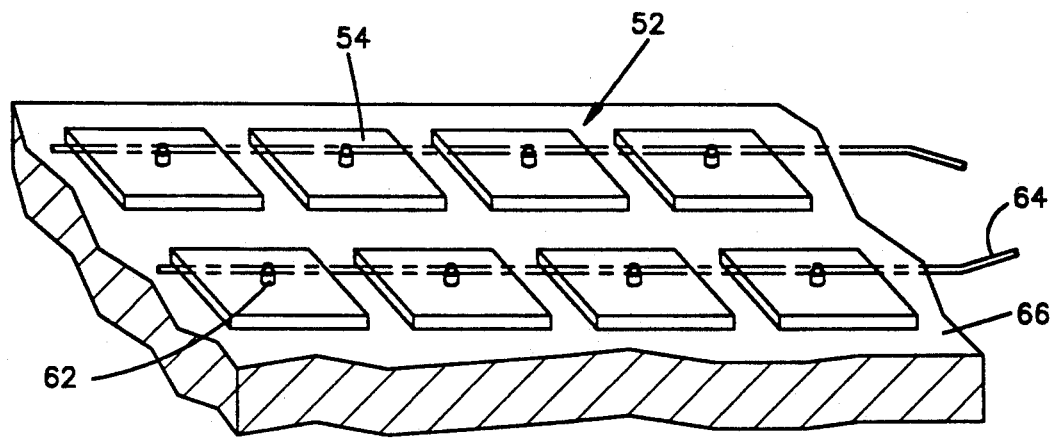
FIG. 4 is a perspective view of a reinforced concrete structure and chloride ion removal apparatus applied to a surface of said structure in accordance with an embodiment of the present invention.
Figure 5:
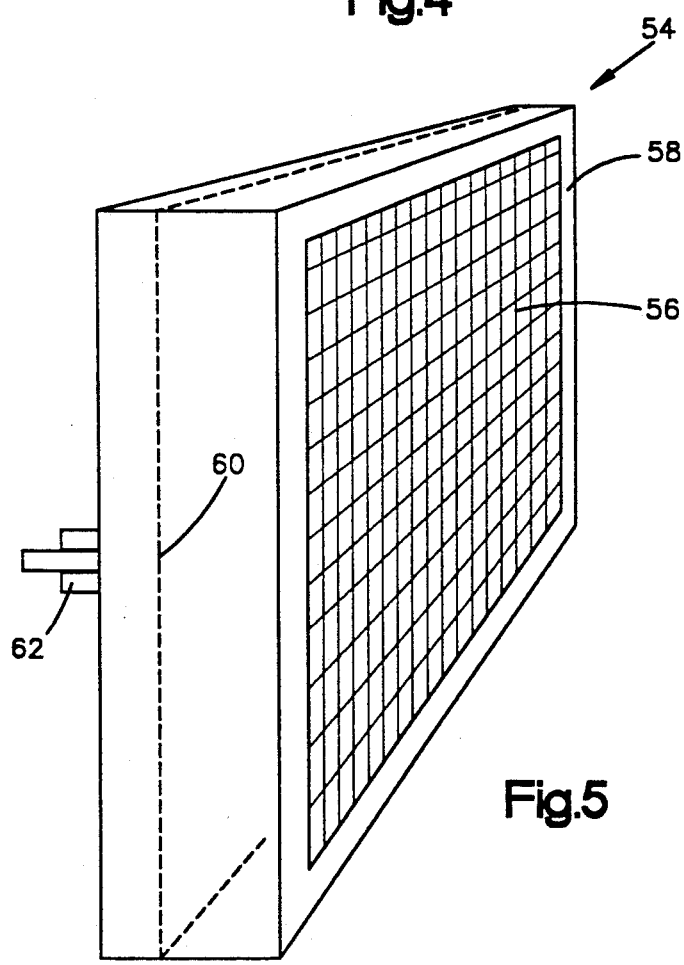
FIG. 5 is a perspective view of a portion of the apparatus of the embodiment of FIG. 4.

In the embodiments of FIGS. 4 and 5, the integrated anode assembly 52 is in the form of tiles 54 which are discrete and separate. Each of the tiles 54 has an area 56 which is impregnated with electrolyte and an outer peripheral area 58 which is provided with an adhesive, for instance a contact adhesive, by which the tiles 54 can be adhered to a surface. Preferably, a dimensionally stable anode 60 (FIG. 5) is imbedded within each tile. Each anode 60 is provided with an anode contact 62. The anode contacts 62 of several tiles are connected together by flexible header cables 64 which in turn are connected to the positive terminal of a power supply (not shown). The individual tiles are positioned on the surface of the concrete structure 66, as shown in FIG. 4, sufficiently closely spaced together to cover a substantial surface area of the concrete structure. The peripheral areas 58 for each tile 54 can function to hold the tile 54 to the concrete surface and to seal the electrolyte areas 56 from evaporation of electrolyte solution. The individual tiles can be removed, regenerated and use again on other structures. As with the embodiment of FIG. 3, the individual tiles can have or be covered with a backing member, not shown, such as a plywood slab, integral with the tiles or placed over the tiles to allow the apparatus to be used as a temporary traffic bearing surface and to further suppress evaporation of electrolyte solution from the tiles. Such backing members may be maintained in spaced relationship to the surface of the concrete structure by the use of suitable spacers (also not shown).

By using a plurality of discrete tiles connected together by flexible headers, the apparatus of FIGS. 4 and 5 can be made to conform to an irregular surface similar to the apparatus of FIGS. 1–3. Although the tiles 54 have been shown square-shaped, it is to be understood that a great variety of shapes are contemplated, e.g., rectangles, squares, circles and so forth.

If desired, in the embodiments of FIGS. 1–3 and FIGS. 4, 5, the backing plate can be steel and can be used as the anode. In such instance, the backing plate would constitute a consumable anode.

From the above description of a preferred embodiment of an invention, those skilled in the art will perceive improvements, changes and modifications. Such improvements, changes and modifications within the skill of the art are intended to be covered by the appended claims.

What is claimed is:

1. An integrated, regeneratable and reusable anode assembly for removing chloride ions from a reinforced concrete structure, comprising:
   a flexible metal anode;
   a flexible and porous, multi-component electrolyte sheet, with said anode being immersed in said electrolyte sheet;
   a component of cellulosic fibers in said flexible and porous, multi-component electrolyte sheet;
   a synthetic, polymeric component in said flexible and porous, multi-component electrolyte sheet;
   an electrolyte solution disposed uniformly within said flexible and porous, multi-component electrolyte sheet;
   means for releasibly adhesively adhering said integrated anode assembly to said concrete structure when said anode assembly is at least substantially conformed to the surface configuration of said concrete structure, whereby said assembly can be removed from said concrete structure, regenerated and reused; and
   means to establish an electric current between said anode and the reinforcement of said concrete structure;
   wherein said electrolyte sheet has an amount of said cellulosic fiber component and said synthetic, polymeric component sufficient to maintain said electrolyte solution substantially uniformly dispersed within said electrolyte sheet for a prolonged period when said assembly is on an angle other than horizontal; and
   wherein said anode and multi-component electrolyte sheet are at least substantially conformable to the surface configuration of said concrete structure.

2. The assembly of claim 1, wherein said porous electrolyte sheet comprises a sheet having a component of cellulosic fibers blended with polymeric fibers.

3. The assembly of claim 1, wherein said porous sheet comprises said synthetic, polymeric component in foamed and layered form, with said sheet having a preponderance of said cellulosic fiber.

4. The assembly of claim 3, wherein said polymeric foam has a pore size ranging from about 10 to about 100 mills and a porosity greater than 90%.

5. The assembly of claim 3, wherein said polymeric foam is a material selected from the group consisting of polyurethane, polyether urethane, polyester urethane, polyesters, olefin polymers, vinyl polymers and polyamides.

6. The assembly of claim 1, wherein said electrolyte solution contains a gelling or thickening agent in an amount effective to thicken said solution and said porous sheet has pore size sufficiently small to maintain said uniform dispersion by means of capillary attraction.

7. The assembly of claim 1, wherein said integrated anode assembly can be rolled into the form of a roll and unrolled against said concrete structure surface configuration.

8. The assembly of claim 1, in rolled form having sufficient flexibility to be unrolled from said roll form and at least substantially conformed to a surface to which it is adhered.

9. The assembly of claim 1, wherein said anode has sufficient ductility that once conformed to a surface configuration, it retains such conformation until reconformed.

10. The assembly of claim 1, wherein said electrolyte sheet comprises layers of porous electrolyte sheet with said anode being sandwiched between said layers of porous electrolyte sheet.

11. The assembly of claim 1, wherein said flexible anode is a perforate anode, said anode being sandwiched into said porous electrolyte sheet.

12. The assembly of claim 1, wherein said electrolyte sheet comprises an electrolyte solution dispersed in said sheet, further comprising a flexible and electrolyte impervious cover adhered to said sheet.

13. The apparatus of claim 1, wherein said means for releasably adhering said integrated anode assembly to said concrete structure comprises adhesive means on the face of the electrolyte sheet, said adhesive means comprising a plurality of adhesive areas which are spaced apart one from another adapted to contact the surface of the concrete structure and to hold said assembly to the concrete structure, said areas of adhesive being in alternating sequence with areas of electrolyte also in contact with the surface of the concrete structure.

14. The assembly of claim 1, wherein said integrated anode assembly is in the form of discrete tiles, said tiles being connected together by current conducting headers.

15. The assembly of claim 1, comprising a load bearing surface spaced from said concrete structure, said integrated anode assembly being between said concrete structure and said load bearing surface.

16. The assembly of claim 15, wherein said load bearing surface is an electrolyte impervious, electrically conductive plate.

17. The assembly of claim 16, wherein said plate constitutes a consumable anode and is spaced from said concrete structure by metal spacing means.

18. The assembly of claim 1, wherein said anode is a dimensionally stable anode.

19. The assembly of claim 18, wherein said anode is a valve metal substrate coated with an electrically conductive, electrocatalytic coating.

20. The assembly of claim 17, wherein said substrate is titanium and said coating is a platinum group metal or oxide.

21. The assembly of claim 1, wherein said anode in said integrated anode assembly is spaced about 0.25 inch to about two inches away from said concrete structure surface.

* * * * *